US012114682B2

(12) United States Patent
Vlasie et al.

(10) Patent No.: US 12,114,682 B2
(45) Date of Patent: Oct. 15, 2024

(54) USE OF PEPTIDYLARGININE DEIMINASE TO OBTAIN IMPROVED SWEET PROTEIN

(71) Applicant: DSM IP ASSETS B.V., Heerlen (NL)

(72) Inventors: Monica Diana Vlasie, Echt (NL); Marco Alexander Van Den Berg, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 919 days.

(21) Appl. No.: 15/734,094

(22) PCT Filed: Jun. 3, 2019

(86) PCT No.: PCT/EP2019/064278
§ 371 (c)(1),
(2) Date: Dec. 1, 2020

(87) PCT Pub. No.: WO2019/233923
PCT Pub. Date: Dec. 12, 2019

(65) Prior Publication Data
US 2021/0219584 A1    Jul. 22, 2021

(30) Foreign Application Priority Data
Jun. 7, 2018 (EP) .................................... 18176428

(51) Int. Cl.
*A23L 27/30* (2016.01)
*A23L 29/00* (2016.01)

(52) U.S. Cl.
CPC ............... *A23L 27/31* (2016.08); *A23L 29/06* (2016.08)

(58) Field of Classification Search
CPC .................................. A23L 27/31; A23L 29/06
See application file for complete search history.

(56) References Cited

U.S. PATENT DOCUMENTS 5,478,923 A * 12/1995 Kim .................. C07K 14/43
536/23.4
2009/0297689 A1  12/2009 Edens et al.

FOREIGN PATENT DOCUMENTS

| CN | 101479380 A | 7/2009 |
| WO | 2008000714 A1 | 1/2008 |
| WO | 2012031878 A1 | 3/2012 |
| WO | 2017009100 A1 | 1/2017 |

OTHER PUBLICATIONS

International Search Report Issued in Counterpart Application No. PCT/EP2019/064278, Mailed on Aug. 30, 2019.
Ohta et al., "Critical molecular regions for elicitation of the sweetness of the sweet-tasting protein, thaumatin I" The FEBS Journal 2008, vol. 275, p. 3644-3652.
Needleman et al., "A General Method Applicable to the Search for Similarities in the Amino Acid Sequence of Two Proteins" (1970) J. Mol. Biol. 48, 443-453.

(Continued)

*Primary Examiner* — Katherine D Leblanc
(74) *Attorney, Agent, or Firm* — McBee Moore & Vanik, IP, LLC

(57) ABSTRACT

The present invention describes a process for modifying a sweet protein or a taste modifying protein, comprising incubating a sweet protein solution or a taste modifying protein solution with a peptidyl arginine deiminase (PAD).

13 Claims, 2 Drawing Sheets
Specification includes a Sequence Listing.

(56) References Cited

OTHER PUBLICATIONS

Rice et al., "EMBOSS: The European Molecular Biology Open Software Suite" Trends in Genetics 16, (6) pp. 276-277, http://emboss.bioinformatics.nl/.

Hu, "Study on the Production of L-citrulline by Engineering Bacteria and Applied to the Tobacco," with English abstract, China Tobacco Shandong Industrial Co. ltd, 2012, 33(8): 55-58.

* cited by examiner

SEQUENCE LISTING

<160> NUMBER OF SEQ ID NOS: 1

<210> SEQ ID NO 1
<211> LENGTH: 640
<212> TYPE: PRT
<213> ORGANISM: Fusarium graminearum -continued

<400> SEQUENCE: 1

Met His Leu Leu Asn Gly Lys Thr Ala Ala Val Ala Leu Ala Leu Leu
1               5                   10                  15

Asn Ser Cys Asn Ala Leu Lys Val Thr Ile Leu Ala Asp Thr Asn Arg
            20                  25                  30

Asp Gly Lys Val Asp Asn Asn Asp Ile Asn Gly Lys Ser Thr Trp Thr
        35                  40                  45

Asn Asn Arg Gly Ala Leu Ile Leu Pro Asn Ile Gly Asp Thr Gly Ser
    50                  55                  60

Arg Cys Ala Lys Gln Trp Gly Pro Ser Val Asp Ile Gln Gly Asp Glu
65                  70                  75                  80

Ser Tyr Leu Asp Lys Cys Asn Asp Ala Ser Asp Asn Val Gln Arg Asn
                85                  90                  95

Pro Lys Tyr Leu Ala Ser Leu Lys Thr Leu Pro Leu Thr Thr Leu Ser
            100                 105                 110

Ala Thr Ala Lys Gly Ser Ile Ile Ile Ala Asp Lys Thr Gly Ala Ser
        115                 120                 125

Lys Val Arg Ile Phe Val Lys Gln Ser Gly Lys Trp Asn Tyr Val Ala
130                 135                 140

Ala Asp His Val Phe Thr Ala Lys Glu Leu Lys Ser Gly Leu Glu Leu
145                 150                 155                 160

Gly Val Asp Ala Arg Asp Val Arg Arg Pro Gln Asp Trp Asn Gly Tyr
                165                 170                 175

Ala Lys Ile Gln Phe Thr Val Thr Asp Gly Lys Thr Lys Ala Thr Asp
            180                 185                 190

Ala Val Ala Val Arg Val Ala Pro Val Leu Thr His His Gly Gln
        195                 200                 205

His Ala Gln Arg Ile Phe Thr Thr Gly Val Asn Glu Ala Gly Val Asn
210                 215                 220

Lys Val Gln Glu Thr Phe Ile Ala Asp Ile Leu Arg Asn Val Ala Gly
225                 230                 235                 240

Ala Gly Ile Lys Glu Pro Val Phe Gln Phe His Asn Gln Asp Ile Trp
            245                 250                 255

Thr Gln Asp Phe Phe Glu Pro Gly Tyr Ala Ser Ile Pro Gly Pro Asn
        260                 265                 270

Gly Pro Val Ser Ile Arg Ile Met Ile Arg Ser Ala Gln Ser Ser Arg
    275                 280                 285

Arg Ser Gly Arg Asp Ala Phe His Asp Leu Arg Asn Asp Gln Val Gly
290                 295                 300

Ala Val Gln His Pro Gly Asp Gly Asp Ser Ile Asp Ser Thr Gly Asn
305                 310                 315                 320

Leu Glu Thr Ile Pro Pro Tyr Ser His Asn Gly Lys Ser Phe Pro Val
                325                 330                 335

Gly Arg Thr Ile Met Gly Ala Trp Asp Gly Arg Ala Pro Leu Met Val
            340                 345                 350

Glu Phe Leu Lys Ala Gln Gln Val Gln Glu Pro Leu Ile Leu Asp Thr
        355                 360                 365

Ser Trp Leu Tyr Val Gly His Val Asp Glu Phe Ile Gln Phe Leu Pro
    370                 375                 380

Ser Asn Asn Lys Leu Gly Trp Val Ile Met Val Ala Asp Pro Met Lys
385                 390                 395                 400

```
Gly Val Asp Leu Leu Lys Lys Ala Val Lys Thr Gly His Gly Lys Val
            405             410             415

Lys Ala Val Ser Arg Pro Leu Ser Ala Asp Glu Lys Lys Glu Gln Leu
            420             425             430

Cys Leu Pro Arg Gln Thr Ile Ala Glu Ala Leu Lys Phe Lys Ser Phe
            435             440             445

Asp Ala Ile Asn Lys His Ser Ala Glu Arg Ile Gln Ala Asn Leu Asp
            450             455             460

Ile Ile Lys Arg Glu Thr Gly Ile Thr Asp Glu Asp Ile His Arg Val
465             470             475             480

Pro Ala Leu Phe Tyr Tyr Thr Gln Ser Asn Ser Trp Leu Cys Pro Gly
            485             490             495

Glu Thr Ala Glu Asp Asp Ser Ala Gln Pro Gln Lys Ala Ala Ser Asn
            500             505             510

Ser Gly Ile Thr Met Lys Thr Ser Gln Gly Gly Pro Gly Phe Lys Ala
            515             520             525

Lys Ser Ile Val Glu Ala Ala Thr Pro Gly Lys Ser Ile Gln Arg Arg
            530             535             540

Val Ile Asp Pro Ala Thr Gln Val Thr Ala Leu Tyr Pro Gly Ser Val
545             550             555             560

Asn Gly Leu Val Met Thr Asp Thr Lys Ile Leu Ala Pro Ser Pro Trp
            565             570             575

Gly Pro Val Ile Asn Lys Gln Asp Ile Phe Ala Ala Ala Val Ser Gln
            580             585             590

Val Tyr Thr Asn Ala Gly Tyr Asn Val Thr Tyr Gln Asp Asp Trp Phe
            595             600             605

Ser His Phe Lys Leu Gln Gly Asp Val His Cys Gly Ser Asn Ser Trp
            610             615             620

Arg Glu Ile Pro Lys Lys Trp Trp Asp Ser Leu Arg Val Asn Asn Tyr
625             630             635             640
```

USE OF PEPTIDYLARGININE DEIMINASE TO OBTAIN IMPROVED SWEET PROTEIN

CROSS-REFERENCE TO RELATED APPLICATIONS

This application is the National Stage entry of International Application No. PCT/EP2019/064278, filed 3 Jun. 2019,
which claims priority to European Patent Application No. 18176428.3, filed 7 Jun. 2018.

REFERENCE TO SEQUENCE LISTING SUBMITTED AS A COMPLIANT ASCII TEXT FILE (.txt)

Pursuant to the EFS-Web legal framework and 37 C.F.R. § 1.821-825 (see M.P.E.P. § 2442.03(a)), a Sequence Listing in the form of an ASCII-compliant text file (entitled "Sequence_Listing_2919208-544000_ST25.txt" created on 24 Nov. 2020, and 5,665 bytes in size) is submitted concurrently with the instant application, and the entire contents of the Sequence Listing are incorporated herein by reference.

BACKGROUND

Field

The present invention relates to the food field.

Description of Related Art

Thaumatin is a low-calorie sweetener and flavour modifier. The protein is often used primarily for its flavour-modifying properties and not exclusively as a sweetener. Some proteins in the thaumatin family of sweeteners are roughly 2000 times more potent than sugar. Although very sweet, thaumatin's taste is markedly different from sugar's. The sweetness of thaumatin builds very slowly. Perception lasts a long time, leaving a liquorice-like aftertaste at high usage levels. The relative late point in time at which the sweetness of sweet proteins can be perceived as well as the aftertaste hamper the use of sweet proteins as a sweetener.

The goal of the invention is to improve the characteristics of sweet proteins.

Surprisingly, this goal can be achieved by incubating a sweet protein with a peptidyl arginine deiminase (PAD).

SUMMARY

The present invention relates to a process for modifying a sweet protein or a taste modifying protein, comprising incubating a sweet protein solution or a taste modifying protein solution with a peptidyl arginine deiminase (PAD).

In another aspect, the invention provides a modified sweet protein or a modified taste modifying protein.

In yet another aspect, the invention provides use of PAD for improving multiple taste properties of a taste modifying protein or of a taste modifying protein.

In a further aspect, the invention provides a composition comprising a sweet protein or a taste modifying protein and PAD as well as a food or drink comprising such a composition.

The invention also provides a method for producing a food or a drink.

SEQUENCE LISTING

Figure 1:
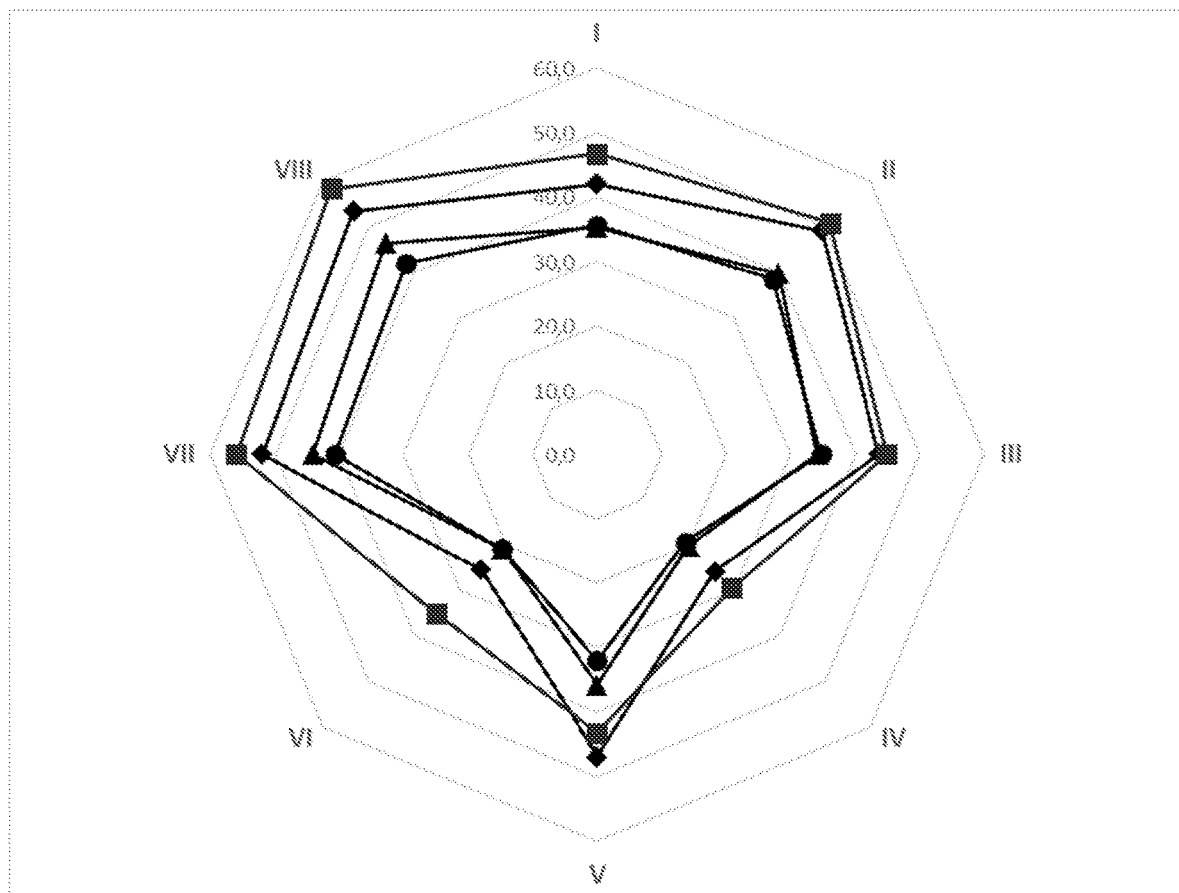
FIG. 1: Sensory attributes of a 2% solution of rapeseed protein isolate with and without PAD treatment. ■: Sensory attributes of rapeseed protein isolate solution untreated with PAD; ◆: sensory attributes of rapeseed protein isolate solution treated with 2U PAD per L; ▲: sensory attributes of rapeseed protein isolate solution treated with 20 U of PAD per L; •: sensory attributes of rapeseed protein isolate solution treated with 60 U of PAD per L. Sensory attributes are astringency mouthfeel (I), flavor intensity (II), sweet flavor (III), bitter flavor (IV), liquorice flavor (V), bitter aftertaste (VI), length aftertaste (VII), and astringent aftertaste (VIII).

SEQ ID NO: 1 Peptidyl arginine deiminase from Fusarium graminearum

DETAILED DESCRIPTION

Sweet proteins are found in plants, mainly of tropical origin and can be intensely sweet, orders of magnitude sweeter than sucrose (such as thaumatin, monellin, brazzein) or with a similar sweetness intensity to sugar, such as egg lysozyme. Besides being sweet, no sequence or structure homology was recognized so far between these proteins. However, they are proposed to interact with the same sweet taste receptor as the small sweet molecules, albeit in a different mode of interaction. Certain features were recognized as important for these sweet proteins to interact with the sweet taste receptor. One such feature is the presence of positively charge residues at the binding interface (Keisuke Ohta, et al, The FEBS Journal 2008, vol275, p 3644-3652). Mutants of thaumatin in which arginine residues were exchanged for alanine or lysine were shown to change the sweetness threshold values of this proteins. However, not all the arginine residues were modified and no more than one residue mutated at one time in a mutant (single mutants). In addition, to the best of our knowledge no changes from arginine to citrulline residues were described in sweet protein to date.

Surprisingly, the inventors of the present invention show herein that changes of arginine to citrulline by addition of an arginine modifying enzyme, PAD, changes the sweetness perception of sweet proteins. The invention therefore provides a method for modifying at least one sensory aspect of a protein comprising incubating said protein with PAD.

Sweet proteins and taste modifying protein have been described in the prior art. However, they are hardly used due to the fact that these proteins also have some disadvantages.

Surprisingly, the inventors of the present invention show herein that some of these disadvantages can be overcome by treating a sweet protein or by treating a taste modifying protein with a peptidyl arginine deiminase.

The invention thereof provides a process for modifying a sweet protein or a taste modifying protein, comprising incubating a sweet protein solution or a taste modifying protein solution with a peptidyl arginine deiminase (PAD).

PAD can be used to modify a property of a sweet protein and hence the invention provides a process for modifying a sweet protein, comprising incubating a sweet protein solution with a peptidyl arginine deiminase (PAD). Different properties of a sweet protein can be modified, such as —but not limited to—aftertaste, the time period in which sweetness is perceived or the onset of sweetness. The invention therefore provides a process for reducing the aftertaste of said sweet protein, comprising incubating a sweet protein solution with a peptidyl arginine deiminase (PAD), a process for reducing the time in which the sweetness of said sweet protein is perceived, comprising incubating a sweet protein solution with a peptidyl arginine deiminase (PAD), or a process method for reducing the time in which the onset of the sweetness is perceived, comprising incubating a sweet protein solution with a peptidyl arginine deiminase (PAD)

PAD can also be used to modify a property of a taste modifying protein and hence the invention provides a process for modifying a taste modifying protein, comprising incubating a taste modifying protein solution with a peptidyl arginine deiminase (PAD).

The term sweet protein as used herein refers to a protein that binds to the human sweet taste receptor (T1R2-T1R3 receptor, a heterodimeric G-protein coupled receptor located on specialised cells on the tongue) via (an) arginine (Arg) residue(s) and elicit a sweet sensation in humans. Preferably, the term sweet protein as used herein refers to proteins which have a sweet taste (i.e. the basic taste most commonly perceived when eating foods rich in sugar). Sweet proteins are typically found in tropical plants. Examples of a sweet protein are thaumatin, monellin, brazzein (or pentadin or brazzein/pentadin, the terms are used interchangeably herein) or mabinlin. However, sweet proteins can also be obtained from other sources than tropical plants. Examples of the latter sweet proteins are egg white lysozyme or rapeseed protein. Preferably, the lysozyme is derived from hen, turkey, quail, guinea fowl or soft-shelled turtle. More preferably, the egg white lysozyme is hen egg white lysozyme or turkey egg white lysozyme. A rapeseed protein isolate can comprise different proteins such as cruciferins and napins. Preferably, the rapeseed protein is napin. Preferably, the sweet protein is thaumatin, monellin, brazzein, mabinlin, egg white lysozyme or rapeseed protein. The term taste modifying protein as used herein refers to a protein that binds to the human sweet taste receptor (T1R2-T1R3 receptor, a heterodimeric G-protein coupled receptor located on specialised cells on the tongue) via (an) arginine (Arg) residue(s) and (i) can change the perception of sourness to sweetness without tasting sweet itself or (ii) can change the perception of sourness to sweetness and elicit a sweet sensation in humans as well. The term taste modifying protein as used herein refers to a protein which has little or no sweet taste but has the property of changing sour into sweet taste. Examples of a taste modifying protein are miraculin or curculin (or neoculin or curculin/neoculin, the terms are used interchangeably herein).

In a preferred embodiment, the sweet protein or taste modifying protein is thaumatin, monellin, brazzein/pentadin, mabinlin, egg white lysozyme, rapeseed protein, miraculin or neocurlin/curculin.

The term "modifying" refers to either increasing or decreasing (or reducing) but as described above it preferably refers to decreasing (or reducing).

Whether or not any of the mentioned properties (for example aftertaste) is increased or decreased is determined by comparing to sweet protein which has been incubated under identical conditions but in the absence of PAD.

The term "sweet protein solution" refers to a liquid solution of a sweet protein. If the starting point is a sweet protein powder (i.e. a powder comprising sweet protein), a process of the invention comprises an additional step in which the sweet protein powder is at least partly dissolved in water or a buffer solution by adding the sweet protein powder to water or a buffer solution and allowing the powder to at least partly dissolve in said liquid. Depending on the characteristics of the sweet protein powder it might be needed to mix the powder with the liquid for a certain amount of time optionally using some heat to improve/speed up the dissolving process. Alternatively, a suspension is prepared in water or a suitable buffer. I.e. an optional additional step of a method of the invention is: comprising dissolving sweet protein powder to obtain a sweet protein solution or to obtain a sweet protein suspension.

The term "taste modifying protein solution" refers to a liquid solution of a taste modifying protein. If the starting point is a taste modifying protein powder (i.e. a powder comprising taste modifying protein), a process of the invention comprises an additional step in which the taste modifying protein powder is at least partly dissolved in water or a buffer solution by adding the taste modifying protein powder to water or a buffer solution and allowing the powder to at least partly dissolve in said liquid. Depending on the characteristics of the taste modifying protein powder it might be needed to mix the powder with the liquid for a certain amount of time optionally using some heat to improve/speed up the dissolving process. Alternatively, a suspension is prepared in water or a suitable buffer. I.e. an optional additional step of a method of the invention is: comprising dissolving taste modifying protein powder to obtain a sweet protein solution or to obtain a sweet protein suspension.

The step of "incubating a sweet protein solution or a taste modifying protein solution with a peptidyl arginine deiminase (PAD)" can be performed at any suitable pH for any suitable time and with any suitable enzyme concentration. The skilled person is very well capable of establishing a suitable enzyme amount or a suitable incubation temperature or a suitable incubation pH or a suitable incubation time, for instance incubating protein with a peptidyl arginine deiminase at a pH of between 4 and 9, such as a pH of between 5 and 8.5, such as a pH of between 5.5 and 8, such as a pH between 6 and 7, or a pH of between 6.2 and 6.8, for instance at a pH of about 6.5. A suitable temperature at which protein is incubated with PAD may be between 20 and 60 degrees Celsius, such as a between 30 and 50, or between 35 and 45 degrees Celsius.

The term protein arginine deiminase and peptidyl arginine deiminase (PAD) are used interchangeably herein. Protein or peptidyl arginine deiminases belong to a family of enzymes (EC 3.5.3.15) which convert peptide or protein bound arginine into peptide or protein bound citrulline. This process is called deamination or citrullination. In the reaction from arginine to citrulline, one of the terminal nitrogen atoms of the arginine side chain is replaced by an oxygen. The reaction uses one water molecule and yields ammonia as a side product (en.wikipedia.org/wiki/Citrullination). Whereas arginine is positively charged at a neutral pH, citrulline is uncharged. Surprisingly, it was found that a protein wherein at least part of the arginine has been converted into citrulline, and thereby resulting in protein with less charge, exhibited modified sweetness, liquorice, astringency, powdery/chalk, fulness, thickness and/or digestibility.

Peptidyl arginine deiminase (PAD) may be derived from any suitable origin, for instance from mammalian or microbial origin. PAD's used in the present invention are advantageously derived from a microbial source, i.e. the PAD used in a process of the invention is a microbial PAD. For instance, PAD's may be derived from fungal origin such as from *Fusarium* sp. such as *Fusarium graminearum, Chaetomium globosum, Phaesphaeria nodorum* or from bacterial origin such as from the bacteria *Streptomyces*, eg *Streptomyces scabies, Streptomyces clavuligeres*. The wording "derived" or "derivable" from with respect to the origin of a polypeptide as disclosed herein, means that when carrying out a BLAST search with a polypeptide as disclosed herein, the polypeptide may be derivable from a natural source, such as a microbial cell, of which an endogenous polypeptide shows the highest percentage homology or identity with the polypeptide as disclosed herein.

Peptidyl arginine deiminases are for instance known from WO2008/000714. WO2008/000714 discloses a process for enzymatically treating a protein with a protein arginine deiminase, wherein at least 30% of the arginine is transformed into citrulline.

A peptidyl arginine deiminase may be a pure or purified peptidyl arginine deiminase. A pure of purified peptidyl arginine deiminase is an enzyme that may be at least 50% pure, e.g., at least 60% pure, at least 70% pure, at least 75% pure, at least 80% pure, at least 85% pure, at least 80% pure, at least 90% pure, or at least 95% pure, 96%, 97%, 98%, 99%, 99.5%, 99.9% pure for instance as determined by SDS-PAGE or any other analytical method suitable for this purpose and known to the person skilled in the art.

Preferably, the used peptidyl arginine deiminase is $Ca^{2+}$-independent. More preferably, the used peptidyl arginine deiminase is a microbial PAD and is $Ca^{2+}$-independent.

Advantageously, peptidyl arginine deiminase as used in a process of the invention is a polypeptide which has at least 80%, 85%, 90%, 95%, 96%, 97%, 98%, 99% or 100% identity to the amino acid sequence of SEQ ID NO: 1, or to the mature amino acid sequence of SEQ ID NO: 1, wherein the polypeptide has peptidyl arginine deiminase activity.

For the purpose of this invention, it is defined here that in order to determine the percentage of sequence identity of two amino acid sequences, the sequences are aligned for optimal comparison purposes. In order to optimize the alignment between the two sequences gaps may be introduced in any of the two sequences that are compared. Such alignment can be carried out over the full length of the sequences being compared. Alternatively, the alignment may be carried out over a shorter length, for example over about 20, about 50, about 100 or more amino acids. The sequence identity is the percentage of identical matches between the two sequences over the reported aligned region. The percent sequence identity between two amino acid sequences may be determined using the Needleman and Wunsch algorithm for the alignment of two sequences. (Needleman, S. B. and Wunsch, C. D. (1970) J. Mol. Biol. 48, 443-453). Both amino acid sequences and nucleotide sequences can be aligned by the algorithm. The Needleman-Wunsch algorithm has been implemented in the computer program NEEDLE. For the purpose of this invention the NEEDLE program from the EMBOSS package was used (version 2.8.0 or higher, EMBOSS: The European Molecular Biology Open Software Suite (2000) Rice,P. Longden, I. and Bleasby, A. Trends in Genetics 16, (6) pp276-277, http://emboss.bioinformatics.nl/). For protein sequences EBLOSUM62 is used for the substitution matrix. The optional parameters used are a gap-open penalty of 10 and a gap extension penalty of 0.5. The skilled person will appreciate that all these different parameters will yield slightly different results but that the overall percentage identity of two sequences is not significantly altered when using different algorithms.

A "mature polypeptide" is defined herein as a polypeptide in its final form and is obtained after translation of a mRNA into a polypeptide and post-translational modifications of said polypeptide. Post—translational modifications include N-terminal processing, C-terminal truncation, glycosylation, phosphorylation and removal of leader sequences such as signal peptides, propeptides and/or prepropeptides by cleavage.

A mature polypeptide sequence of SEQ ID NO: 1 may comprise or contain amino acids 19, 20, 21, 22, 23, 24 to 640 of the amino acid sequence of SEQ ID NO: 1, advantageously the mature polypeptide sequence of SEQ ID NO: 1 comprises or contains amino acids 22 to 640 of SEQ ID NO: 1, wherein methionine at position 1 in SEQ ID NO: 1 is counted as number 1.

The term "polypeptide" refers to a molecule comprising amino acid residues linked by peptide bonds and containing more than five amino acid residues. The term "protein" as used herein is synonymous with the term "polypeptide" and may also refer to two or more polypeptides. Thus, the terms "protein" and "polypeptide" can be used interchangeably. Polypeptides may optionally be modified (e.g., glycosylated, phosphorylated, acylated, farnesylated, prenylated, sulfonated, and the like) to add functionality. Polypeptides exhibiting activity in the presence of a specific substrate under certain conditions may be referred to as enzymes.

A peptidyl arginine deiminase, or polypeptide having peptidyl arginine deiminase activity may be produced in any suitable host organism by known methods in the art, for instance in fungi Aspergilli, e.g. *Aspergillus niger* or *Aspergillus oryzae, Trichoderma*, or the yeasts *Saccharomyces*, and *Kluyveromyces* or the bacteria of the genus *Streptomyces* or Bacilli. A suitable method to express a polypeptide having peptidyl arginine deiminase activity in *Aspergillus niger* is for instance disclosed in Examples 3 and 4 in WO2008/000714, which is herein included by reference.

In further aspect the invention provides a modified sweet protein
- obtainable by a process of the invention (as described herein above), or
- I wherein at least 1 arginine is converted into a citrulline.

In yet a further aspect, the invention provides a modified taste modifying protein
- obtainable by a process of the invention (as described herein above), or
- wherein at least 1 arginine is converted into a citrulline.

PAD converts peptide or protein bound arginine into peptide or protein bound citrulline and hence whether or not a sweet protein or a taste modifying protein has been citrullinated/deimidated can easily be determined. The presence of a citrulline in a sweet protein or taste modifying protein can, for example, be determined via an amino acid analysis as well known to the skilled person.

The invention also provides use of peptidyl arginine deiminase (PAD) for reducing the aftertaste of a sweet protein or for reducing the time in which the sweetness of the sweet protein is perceived or method for reducing the time in which the onset of the sweetness is perceived.

The invention further provides a composition comprising a sweet protein or a taste modifying protein and peptidyl arginine deiminase (PAD). Preferably, said PAD is inactivated. In activation of PAD can for example be obtained by a heat treatment after incubation of said sweet protein or aid taste modifying protein with said PAD.

The invention further provides a food or drink which comprises
- a composition comprising a sweet protein or a taste modifying protein and peptidyl arginine deiminase (PAD), or
- a modified sweet protein wherein at least 1 arginine is converted into a citrulline, or
- a modified taste modifying protein wherein at least 1 arginine is converted into a citrulline.

Sweet proteins and taste modifying proteins are typically used to provide a food or drink with a sweet taste or with a reduced sour taste. The invention also provides a method for producing a food or drink comprising
- adding a composition as described herein to a food or drink or to an intermediate thereof, or
- adding a sweet protein or a taste modifying protein and PAD to a food or drink or an intermediate thereof, or
- adding a modified sweet protein obtained by a process as described herein, or
- adding a modified taste modifying protein obtained by a process as described herein.

The invention will be explained in more detail in the following example, which are not limiting the invention.

EXAMPLE 1

Sensory Assessment of Rapeseed Protein Isolate (RPI) Treated with PAD Enzyme

Per sample, 1000 ml 2% RPI protein powder suspensions were made (plant protein powders corrected for protein content) in tap water and pH adjusted to pH −6.5 with 4M $H_2SO_4$.

The rapeseed protein isolate was prepared from cold-pressed rapeseed oil seed meal as described in patent application WO 2018/007492.

Suspensions were incubated for 2 h at 45° C. with and without PAD enzyme addition at different enzyme dosage. The enzyme was inactivated, by heating the materials at 65° C., with a holding time of 5 minutes. The samples were evaluated by means of descriptive analysis (QDA) with the sensory panel (n=13) on attributes relevant for the product in the test. During the test the samples were offered according to an optimally balanced design and were scored on 0-100 unstructured line scales in EyeQuestion in duplicate. The data were analyzed with an ANOVA to find significant differences between the individual samples. Differences with p<0.05 were considered as significant (FIG. 1). By treatment of RPI with PAD enzyme, all sensory attributes such as sweetness, liquorice, astringency, bitter, length aftertaste (as described in the figure legend), tested were decreased with increasing the amount of PAD added.

EXAMPLE 2

Figure 2:
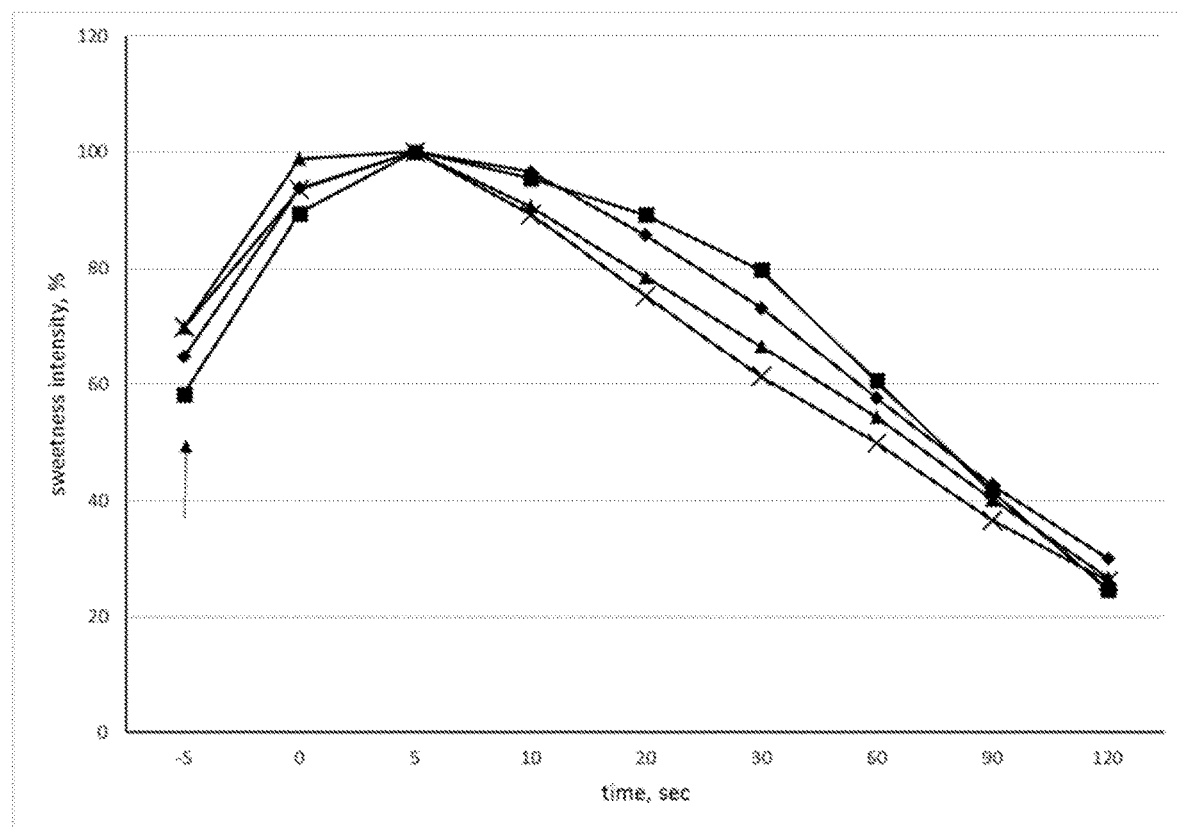
FIG. 2: Development of sweetness intensity of rapeseed protein solutions in time with and without PAD. ■: 2% solution of rapeseed protein isolate, no PAD added; ◆: 2% solution of rapeseed protein isolate, 2U PAD per L added; ▲: 2% solution of rapeseed protein isolate, 20U PAD per L added; x: 2% solution of rapeseed protein isolate, 60 U PAD per L added. X-axis: time (sec), Y-axis: relative sweetness (%) whereby sweetness of each sample was normalized at 100% at 5 seconds after swallowing. The arrow at −5 sec indicates the sweetness perceived directly in the mouth before swallowing, while 0 sec represents the sweetness immediately after swallowing the sample.

Sweetness Time Intensity Assessment of Rapeseed Protein Isolate Treated with PAD Aqueous rapeseed protein powder suspensions were made (1000 mL, 2% w/w) in tap water and the pH was adjusted to 6.5 with 4M $H_2SO_4$. Suspensions were incubated for 2 h h at 45° C. with and without PAD addition at different enzyme dosage. The enzyme was further inactivated, by heating the materials at 65° C., with a holding time of 5 minutes. A trained panel (n=12) rated the sweet intensity of the samples at several time points: directly after intake, after three seconds the sample was swallowed and the intensity was scored again, and further scoring was at 5, 10, 20, 30, 60 and 120 seconds after swallowing. Intensity scores were given on unstructured 0-100 line scales in EyeQuestion. Samples were evaluated in duplicate and offered according to an optimally balanced design. The data were analyzed with ANOVA to find significant differences between individual samples; differences with p<0.05 were considered as significant. The temporal sweetness profile is shown in FIG. 2. Sweetness of each sample was normalized at 100% at 5 seconds after swallowing. The protein sample treated with PAD enzyme shows a more rapid onset of sweetness (the sweet perception in the mouth and immediately after swallowing), while the sweetness intensity decreases more rapidly in the enzyme treated samples, 5 seconds after swallowing. The changes in the sweetness perception is seen as PAD enzyme dose dependent as in the example 1.

EXAMPLE 3

Sweetness Profile of Thaumatin Treated with PAD

Thaumatin obtained from Naturex (Talin T-0004) was prepared in water at a concentration of 50 parts per million. To this solution 50 mU PAD/L was added and incubated at 45° C. for 2 hours. The enzyme was then inactivated by heating the solution at 65° C., holding time 5 min. An experienced panel of 10 people tasted the thaumatin solution with and without PAD enzyme treatment. The sweetness intensity changes with the PAD enzyme treatment and the temporal profile of the sweetness with the enzyme addition were similar as described for the rapeseed protein (example 1 and example 2 respectively). The PAD enzyme reduces the intensity of sweetness of thaumatin, while the onset of sweetness is faster and the length of the sweet sensation is decreased.

The invention claimed is:

1. A process for modifying a sweet protein or a taste modifying protein, comprising incubating a sweet protein solution or a taste modifying protein solution with a peptidyl arginine deiminase (PAD), wherein said sweet protein or said taste modifying protein is thaumatin, a rapeseed protein, monellin, brazzein/pentadin, mabinlin, egg white lysozyme, miraculin or neocurlin/curculin.

2. The process according to claim 1, wherein said process is a process for reducing the aftertaste of said sweet protein.

3. The process according to claim 1, wherein said process is a process for reducing the time in which the sweetness of said sweet protein is perceived.

4. The process according to claim 1, wherein said process is a process for reducing the time in which the onset of the sweetness is perceived.

5. The process according to claim 1, wherein said rapeseed protein is napin.

6. The process according to claim 1, wherein said PAD is a microbial PAD.

7. The process according to claim 1, wherein the PAD has at least 80% sequence identity to the amino acid sequence of SEQ ID NO:1, or has at least 80% sequence identity to the mature amino acid sequence of SEQ ID NO:1.

8. A modified sweet protein
obtained by the process according to claim 1, or
wherein at least 1 arginine is converted into a citrulline.

9. A modified taste modifying protein
obtained by the process according to claim 1, or
wherein at least 1 arginine is converted into a citrulline.

10. A composition comprising a sweet protein or a taste modifying protein and peptidyl arginine deiminase (PAD),
wherein said sweet protein or said taste modifying protein is thaumatin, a rapeseed protein, monellin, brazzein/pentadin, mabinlin, egg white lysozyme, miraculin or neocurlin/curculin.

11. The composition according to claim 10, wherein said PAD is inactivated.

12. A food or drink which comprises the composition according to claim 10.

13. A method for producing a food or drink comprising adding a composition comprising a sweet protein or a taste modifying protein and PAD to a food or drink or to an intermediate thereof, or
adding a sweet protein or a taste modifying protein and PAD to the food or drink or the intermediate thereof, or
adding a modified sweet protein obtained by the process according to claim 1 to the food or drink or the intermediate thereof, or
adding a modified taste modifying protein obtained by the process according to claim 1 to the food or drink or the intermediate thereof, wherein said sweet protein or said taste modifying protein is thaumatin, a rapeseed protein, monellin, brazzein/pentadin, mabinlin, egg white lysozyme, miraculin or neocurlin/curculin.

* * * * *